(12) United States Patent
Stewart et al.

(10) Patent No.: US 8,105,541 B2
(45) Date of Patent: Jan. 31, 2012

(54) REACTOR SYSTEM AND METHOD THEREFORE

(75) Inventors: Albert E. Stewart, Canoga Park, CA (US); Jeffrey A. Mays, Canoga Park, CA (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 210 days.

(21) Appl. No.: 12/575,576

(22) Filed: Oct. 8, 2009

(65) Prior Publication Data

US 2010/0092381 A1    Apr. 15, 2010

Related U.S. Application Data

(60) Provisional application No. 61/104,778, filed on Oct. 13, 2008.

(51) Int. Cl.
*B01J 8/10* (2006.01)
*F27B 15/00* (2006.01)
*B01J 8/02* (2006.01)
*B01J 35/02* (2006.01)

(52) U.S. Cl. ........ 422/139; 422/129; 422/140; 422/141; 422/142; 422/143; 422/211

(58) Field of Classification Search ............. 422/129, 422/139–147, 211; 423/648.1
See application file for complete search history.

(56) References Cited

U.S. PATENT DOCUMENTS

| | | | |
|---|---|---|---|
| 4,071,330 A | | 1/1978 | Sederquist |
| 4,084,545 A | * | 4/1978 | Nack et al. .............. 122/4 D |
| 4,525,268 A | * | 6/1985 | Barger .................... 208/73 |
| 4,750,986 A | | 6/1988 | Pinto |
| 4,836,898 A | | 6/1989 | Noyes et al. |
| 5,213,770 A | | 5/1993 | Noyes |
| 5,221,524 A | | 6/1993 | Eguchi |
| 5,344,629 A | * | 9/1994 | Engstrom .............. 423/239.1 |
| 6,531,099 B1 | * | 3/2003 | Held ....................... 422/171 |
| 6,913,738 B1 | | 7/2005 | Echigo et al. |
| 7,449,167 B2 | | 11/2008 | Garg et al. |
| 7,547,419 B2 | | 6/2009 | Sprouse et al. |
| 2005/0279023 A1 | | 12/2005 | Stewart et al. |
| 2005/0281720 A1 | | 12/2005 | Sprouse et al. |

* cited by examiner

*Primary Examiner* — Walter D Griffin
*Assistant Examiner* — Natasha Young
(74) *Attorney, Agent, or Firm* — Carlson Gaskey & Olds, P.C.

(57) ABSTRACT

A reactor system includes a fluidized bed reactor with a fluidized zone having sorbent particles and catalyst particles. The sorbent particles are sized to become entrained in a product stream from the fluidized zone and the catalyst particles are sized to gravimetrically stay within the fluidized zone.

14 Claims, 1 Drawing Sheet

REACTOR SYSTEM AND METHOD THEREFORE

CROSS-REFERENCE TO RELATED APPLICATION

This application claims the benefit of U.S. Provisional Application No. 61/104,778, filed Oct. 13, 2008, the disclosure of which is herein incorporated by reference in its entirety.

BACKGROUND

This disclosure relates to a chemical apparatus having a fluidized bed.

Reactors are known and used as containment vessels for reactions that may occur at elevated temperatures and/or pressures. As an example, a reactor may be used in generating hydrogen from steam and natural gas. A sorbent material may be used within the reactor to remove product carbon dioxide and thereby facilitate progression of the reaction. The sorbent may be disposed on a fixed support that is exposed to the flow of reactants through the reactor. Alternatively, the sorbent may be provided as particles in a fluidized bed. The particles become entrained in the flow and are later removed, regenerated, and reintroduced into the reactor. In any case, the reaction is reversible and if sufficient carbon dioxide is not removed the process becomes inefficient.

SUMMARY

An exemplary reactor system includes a fluidized bed reactor with a fluidized zone having sorbent particles and catalyst particles. The sorbent particles are sized to become entrained in a product stream from the fluidized zone and the catalyst particles are sized to gravimetrically stay within the fluidized zone.

In another aspect, an exemplary reactor system may include a fluidized bed reactor with a fluidized zone having sorbent particles and catalyst particles. The sorbent particles and the catalyst particles each have an average size. A ratio of the average size of the catalyst particles to the average size of the sorbent particles is such that the sorbent particles become entrained in a product stream from the fluidized zone and the catalyst particles gravimetrically stay within the fluidized zone.

A exemplary method for use with a reactor system includes establishing a first average size of sorbent particles for use in a fluidized bed reactor, and establishing a second average size of catalyst particles for use in the fluidized bed reactor such that the sorbent particles are sized to become entrained in a product stream from a fluidized zone of the fluidized bed reactor and the catalyst particles are sized to gravimetrically stay within the fluidized zone.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
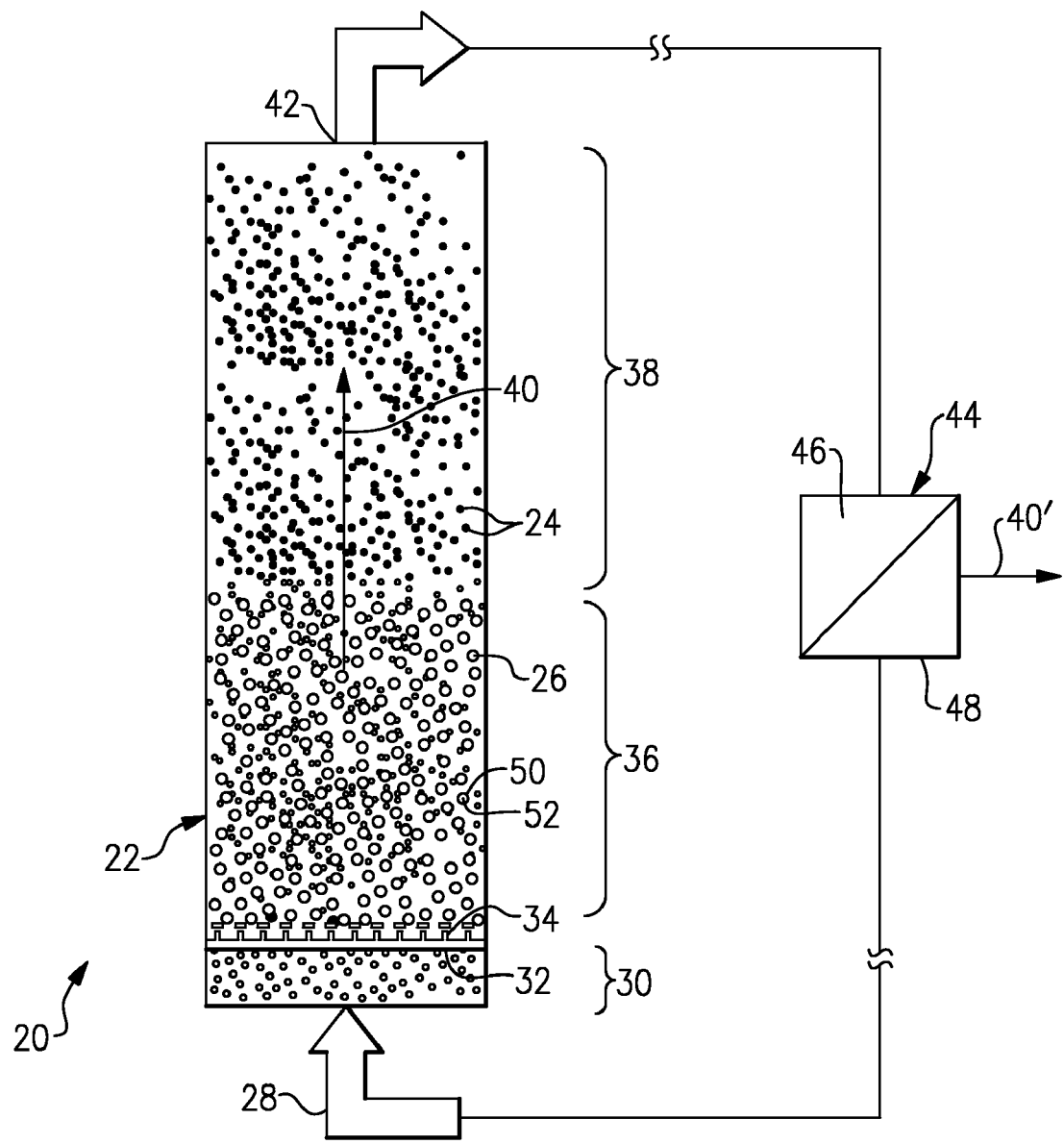
FIG. 1 illustrates an example reactor system.

FIG. 1 illustrates selected portions of an example reactor system 20, such as a system for generating hydrogen. In this example, the reactor system 20 includes a fluidized bed reactor 22 that includes sorbent particles 24 and catalyst particles 26. The examples herein will be described with respect to a hydrogen generation system but may be adapted for other types of reactor systems.

For a hydrogen generation system, the sorbent particles 24 may be calcium oxide (CaO) and the catalyst particles may include a catalytic material, but for other systems, other types of sorbents and catalysts may be selected. As can be appreciated, the reactor system 20 may include additional known components that operate in conjunction with the fluidized bed reactor 22 but are not shown here.

The fluidized bed reactor 22 generally receives a feed 28 of materials, such as the reactants (i.e., steam and natural gas) and the sorbent particles 24. The fluidized bed reactor 22 includes a plenum section 30 having a distributor plate 32 and injectors 34 for injecting the feed 28 into a fluidized zone 36, or reaction zone where the reaction with the feed material occurs. Of course, other types of injection systems may alternatively be used and the examples herein are not limited to any particular type of injection system. An entrainment zone 38 above the fluidized zone 36 receives a product stream 40 from the fluidized zone 36. The product stream 40 exits the fluidized bed reactor 22 at an outlet 42.

The product stream 40 may include hydrogen, carbon dioxide, trace reactants, and entrained sorbent particles 24. A regenerator 44 in connection with the fluidized bed reactor 22 receives the product stream 40. The regenerator 44 may include a separator 46, such as a cyclone, to separate the sorbent particles 24 from a product stream 40' and a calciner 48 to liberate carbon dioxide from the sorbent particles 24 before reintroduction of the sorbent particles 24 into the fluidized bed reactor 22.

The feed 28 is injected through the injectors 34 and reacted (endothermic) in the fluidized zone 36. In this case, the steam and natural gas react to form carbon dioxide and hydrogen products. The sorbent particles 24 physically remove at least a portion of the carbon dioxide by absorption to facilitate pushing the reaction forward toward producing hydrogen. The catalyst particles 26 facilitate the reaction between the steam and natural gas. For instance, the catalyst particles 26 facilitate breaking of the methane and steam. Using the catalyst particles 26 may provide the benefit of reducing the energy input required for the reaction or facilitating the kinetics of the reaction such that the process becomes more efficient, for example.

The removal capacity of the sorbent particles 24 is limited and the sorbent particles 24 are removed from the fluidized bed reactor 22 for regeneration. In comparison, the catalyst particles 26 are not used up in the reaction and there is no need for removal and risk of poisoning from outside exposure or damage from handling. To achieve removal of the sorbent particles 24 without removing the catalyst particles 26, the sorbent particles 24 are sized to become entrained within the product stream 40 and the catalyst particles 26 are sized to gravimetrically stay within the fluidized zone 36 (i.e., "entrainment exclusivity"). In other words, the sorbent particles 24 are light enough to be carried in the product stream 40 (e.g., eluding the fluidized zone 36) and the catalyst particles 26 are heavy enough to avoid being carried from the fluidized zone 36. Entrainment and variations thereof may refer to particles becoming entrapped in a stream of flow such that the stream carries and moves the particles.

As an example, entrainment exclusivity may be achieved by controlling the average size distributions of the sorbent particles 24 and the catalyst particles 26, or controlling a ratio of the average sizes. The following examples illustrate a few features of the sorbent particles 24 and the catalyst particles 26.

The average size of the catalyst particles 26 may be greater than 1200 micrometers and the average size of the sorbent particles 24 may be less than 100 micrometers to achieve entrainment exclusivity. In a further example, average size of the catalyst particles 26 may be 1250-1600 micrometers, and the average size of the sorbent particles 24 may be 50-100 micrometers. The use of the relatively fine sorbent particles 24 may lower the fluidization velocity of the feed materials relative to a feed material of only gas. The velocity of the feed may therefore be set somewhat lower to account for the influence of the sorbent particles 24. The sorbent particles 24 may also have an associated critical velocity above which the sorbent particles 24 become entrained in a stream of flow. For the given exemplary sizes, the critical velocity of the sorbent particles 24 may be less than about 150 centimeters per second (5 feet per second).

The sorbent particles 24 may include a bimodal size distribution wherein some larger particles are added to smaller particles to facilitate circulation through the fluidized bed reactor 22. As an example, the larger particles may have an average size of about 78-300 millimeters within the bimodal size distribution. The smaller particles may have an average size of 1-50 micrometers, such as about 3-9 micrometers, within the bimodal size distribution. The small size may cause agglomeration. The addition of the larger particles facilitates breaking up of the agglomerations, particularly in handling equipment outside of the fluidized bed reactor 22 that is used to regenerate the sorbent particles 24, to promote better flow of the sorbent particles 24 in pipes, storage vessels, gas seals, and the like. The overall average size of the sorbent particles 24 may be between 7 and 10 times smaller than the average size of the catalyst particles 26.

The bimodal distribution may also provide the benefit of increasing the rate of reaction within the reactor system 20. For instance, the bulk of the sorbent particles 24 may be 50-100 micrometers and the remainder (e.g., less than 50 wt %) may be 1-5 micrometers. The active area of the smaller particles is larger than the active area of the larger particles by several orders of magnitude, thereby increasing the ability of smaller particles to capture/retain byproducts and increasing reactivity in regeneration (collectively increased activity). Sorbent particles such as calcium oxide may form a diffusion-resistant shell (similar to a Pilling-Bedworth ratio) that hinders reactivity. Thus, smaller particles can retain greater activity even with the formation of a shell. The bimodal distribution thereby allows increased activity of the small particles while avoiding or reducing agglomeration that is associated with the flow of small particles.

In some examples, a ratio between the average sizes of the catalyst particles 26 and the sorbent particles 24 may be selected to achieve entrainment exclusivity. For instance, the ratio may be between 7 and 10 such that the catalyst particles 26 are, on average, 7 to 10 times larger than the sorbent particles 24. The ratio therefore provides the benefit of ensuring that the difference in the average sizes of the catalyst particles 26 and the sorbent particles 24 is great enough to achieve entrainment exclusivity.

The disclosed particles sizes and ratio between the average sizes of the catalyst particles 26 and the sorbent particles 24 may also influence the character of the flow through the fluidized zone 36. For instance, the relatively large catalyst particles 26 hinder flow of the relatively smaller sorbent particles 24. The hindered flow provides a greater residence time of the sorbent particles 24 in the fluidized zone 36 in comparison to the gas in which the particles flow. The greater residence time in turn facilitates removing a greater amount of byproduct (e.g., carbon dioxide). In one example, the residence time of the sorbent particles is 10-20 times the residence time of the gas.

In the given examples, the sorbent particles 24 may be calcium oxide (CaO). The calcium oxide particles may have a surface area of at least 20 $m^2/g$, and in some examples approximately 25 $m^2/g$. The catalyst particles 26 may include a catalytic material disposed on a support material. For instance, the catalyst particles 26 may be nickel 50 disposed on alumina support particles 52. The composition of the catalyst particles 26 may include about 8-14 wt % nickel with a remainder of the alumina and possibly trace amounts of other materials. The alumina support particles may have a surface area of at least about 8 $m^2/g$, and in some example 10 $m^2/g$. A ratio of the surface area of the sorbent particles 24 to the surface area of the catalyst particles 26 is at least 2.5.

The relatively small size and high surface area of the sorbent particles 24 provides particle longevity in the fluidized bed reactor 22. For instance, calcium oxide particles can sinter with thermal cycling. The sintering causes a reduction in the surface area and reduces reactivity with respect to the carbon dioxide in the fluidized bed reactor 22. Once the surface area of the sorbent particles 24 is reduced below a threshold amount, the particles 24 may be replaced with new particles having a higher surface area, which is an expense to the system. In this regard, the initially high surface area of the example sorbent particles 24 can undergo a large number of thermal cycles before reaching the threshold, such as 5 $m^2/g$. In comparison, larger particles that initially have a lower surface area and reach the threshold with fewer thermal cycles.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A reactor system comprising:
    a fluidized bed reactor including a fluidized zone having sorbent particles and catalyst particles, the sorbent particles are sized to become entrained in a product stream from the fluidized zone and the catalyst particles are sized to gravimetrically stay within the fluidized zone, wherein a ratio of an average size of the catalyst particles to an average size of the sorbent particles is in a range of 7-10.

2. The reactor system as recited in claim 1, wherein the sorbent particles are comprised of calcium oxide, and the catalyst particles are comprised of nickel.

3. The reactor system as recited in claim 1, wherein the sorbent particles are comprised of calcium oxide, and the catalyst particles are comprised of nickel and alumina.

4. The reactor system as recited in claim 1, wherein the catalyst particles are comprised of a catalyst material disposed on a support material.

5. The reactor system as recited in claim 4, wherein the catalyst material comprises nickel and the support material comprises alumina.

6. The reactor system as recited in claim 5, wherein the catalyst particles have a composition of 8-14 wt % of the nickel and a balance of the alumina and any trace impurities.

7. A reactor system comprising:
a fluidized bed reactor including a fluidized zone having sorbent particles and catalyst particles, the sorbent particles are sized to become entrained in a product stream from the fluidized zone and the catalyst particles are sized to gravimetrically stay within the fluidized zone, wherein the sorbent particles are comprised of calcium oxide having a surface area of at least 20 $m^2/g$, and the catalyst particles are comprised of nickel disposed on alumina having a surface area of at least 8 $m^2/g$.

8. The reactor system as recited in claim 7, wherein the sorbent particles are comprised of calcium oxide having a surface area of about 25 $m^2/g$, and the catalyst particles are comprised of nickel disposed on alumina having a surface area of about 10 $m^2/g$.

9. A reactor system comprising:
a fluidized bed reactor including a fluidized zone having sorbent particles and catalyst particles, the sorbent particles are sized to become entrained in a product stream from the fluidized zone and the catalyst particles are sized to gravimetrically stay within the fluidized zone, wherein the sorbent particles are comprised of calcium oxide having a first surface area, the catalyst particles are comprised of nickel disposed on alumina having a second surface area, and a ratio of the first surface area to the second surface area is at least 2.5.

10. A reactor system comprising:
a fluidized bed reactor including a fluidized zone having sorbent particles and catalyst particles, the sorbent particles are sized to become entrained in a product stream from the fluidized zone and the catalyst particles are sized to gravimetrically stay within the fluidized zone, wherein the sorbent particles have a bimodal size distribution.

11. The reactor system as recited in claim 10, wherein the bimodal size distribution includes a first average of 1-50 micrometers and a second average of 70-300 micrometers.

12. A reactor system comprising:
a fluidized bed reactor including a fluidized zone having sorbent particles and catalyst particles, the sorbent particles and the catalyst particles each having an average size, and a ratio of the average size of the catalyst particles to the average size of the sorbent particles is such that the sorbent particles become entrained in a product stream from the fluidized zone and the catalyst particles gravimetrically stay within the fluidized zone, wherein the ratio in a range of 7-10.

13. The reactor system as recited in claim 12, wherein the sorbent particles are comprised of calcium oxide and the catalyst particles are comprised of nickel.

14. A method for use with a reactor system, comprising:
establishing a first average size of sorbent particles for use in a fluidized bed reactor;
establishing a second average size of catalyst particles for use in the fluidized bed reactor such that the sorbent particles are sized to become entrained in a product stream from a fluidized zone of the fluidized bed reactor and the catalyst particles are sized to gravimetrically stay within the fluidized zone; and
establishing a ratio of the second average size to the first average size to be in a range of 7-10.

* * * * *